(12) United States Patent
Silversides et al.

(10) Patent No.: US 11,953,430 B2
(45) Date of Patent: *Apr. 9, 2024

(54) DETERMINATION OF ROCK TYPES BY SPECTRAL SCANNING

(71) Applicant: TECHNOLOGICAL RESOURCES PTY. LIMITED, Melbourne (AU)

(72) Inventors: Katherine Silversides, Glenmore Park (AU); Richard Murphy, Surry Hills (AU); Derek Wyman, Glebe (AU)

(73) Assignee: TECHNOLOGICAL RESOURCES PTY. LIMITED, Melbourne (AU)

( * ) Notice: Subject to any disclaimer, the term of this patent is extended or adjusted under 35 U.S.C. 154(b) by 27 days.

This patent is subject to a terminal disclaimer.

(21) Appl. No.: 17/576,870

(22) Filed: Jan. 14, 2022

(65) Prior Publication Data

US 2022/0136963 A1  May 5, 2022

Related U.S. Application Data

(63) Continuation of application No. 16/197,199, filed on Nov. 20, 2018, which is a continuation of application
(Continued)

(30) Foreign Application Priority Data

Feb. 5, 2010  (AU) ................................ 2010900467

(51) Int. Cl.
*G01N 21/31* (2006.01)
*G01N 21/3563* (2014.01)
(52) U.S. Cl.
CPC ......... *G01N 21/31* (2013.01); *G01N 21/3563* (2013.01)

(58) Field of Classification Search
CPC ........................... G01N 21/31; G01N 21/3563
See application file for complete search history.

(56) References Cited

U.S. PATENT DOCUMENTS

| 4,134,683 A | 1/1979 | Goetz |
| 4,345,840 A | 8/1982 | Goetz et al. |
(Continued)

FOREIGN PATENT DOCUMENTS

| GB | 2298711 | 11/1996 |
| WO | WO 2007/047017 A2 | 4/2007 |

OTHER PUBLICATIONS

PCT Notification of Transmittal of the International Search Report and the Written Opinion of the International Searching Authority, or the Declaration for PCT Counterpart Application No. PCT/AU2011/000117, 7 pages, (dated Mar. 31, 2011).
(Continued)

*Primary Examiner* — Alexander Satanovsky
(74) *Attorney, Agent, or Firm* — Womble Bond Dickinson (US) LLP (57) ABSTRACT

Described herein is a method and system for classifying rock types in a rock body. The method comprises the steps of obtaining spectral data from a spectral measurement (202) of a surface region of the rock body and then determining a first spectral ratio between two wavelength bands of the spectral data. From the first spectral ratio it can be assessed (204) whether the measurement is a high-angle measurement, and if the measurement is not a high-angle measurement then a further spectral ratio between two further wavelength bands of the spectral data is determined (208). The further spectral ratio is then compared (210) with a corresponding diagnostic criterion to assess whether the surface region comprises a first rock type associated with the further spectral ratio and diagnostic criterion.

8 Claims, 8 Drawing Sheets

Related U.S. Application Data

No. 13/577,233, filed as application No. PCT/AU2011/000117 on Feb. 4, 2011, now abandoned.

(56) References Cited

U.S. PATENT DOCUMENTS

| | | | |
|---|---|---|---|
| 4,600,105 A * | 7/1986 | Van Zyl | B07C 5/3425 |
| | | | 209/579 |
| 5,310,248 A | 5/1994 | King | |
| 5,396,260 A | 3/1995 | Adal | |
| 7,403,872 B1 * | 7/2008 | St. Onge | B07C 5/3422 |
| 7,574,821 B2 | 8/2009 | Furem | |
| 2002/0126362 A1 | 9/2002 | Shimomura | |
| 2007/0222663 A1 | 9/2007 | Humphrey et al. | |
| 2007/0265783 A1 | 11/2007 | Mound | |
| 2008/0192987 A1 | 8/2008 | Helgason | |
| 2009/0256412 A1 | 10/2009 | Nieto | |
| 2011/0290026 A1 | 12/2011 | Rice | |

OTHER PUBLICATIONS

Jyoti Behura et al., "Estimation of Interval Anisotropic Attenuation from Reflection Data," Geophysics, vol. 74, No. 6, pp. A69-A74, (Nov.-Dec. 2009).

Ken Watson, "Spectral Ratio Method for Measuring Emissivity," Remote Sensing of Environment, vol. 42, No. 2, pp. 113-116, (Nov. 1992).

Arthur P. Cracknell, "The Advanced Very High Resolution Radiometer," Taylor & Francis Ltd., London, pp. 304.

International Preliminary Report on Patentability for International Application No. PCT/AU2011/000117 from the International Searching Authority, dated Mar. 31, 2011, 5 pages.

Daniel S. Kimes et al. "Learning Class Descriptions from a Data Base of Spectral Reflectance with Multiple View Angles," IEEE Transactions on Geoscience and Remote Sensing, vol. 30, No. 2, Mar. 1992, pp. 315-325.

Dwight D. Egbert et al., "Effect of Angles on Reflectivity," University of Kansas, Lawrence, Kan., 1972, pp. 556-564, https://www.asprs.org/wp-content/uploads/pers/1972journal/jun/1972_jun_556-564.pdf.

Non-Final Office Action dated Apr. 14, 2022 from U.S. Appl. No. 16/197,199, 21 pages.

Non-Final Office Action dated Apr. 21, 2021 from U.S. Appl. No. 16/197,199, 27 pages.

Notice of Allowance dated Oct. 5, 2021 from U.S. Appl. No. 16/197,199, 9 pages.

Notice of Abandonment dated Jul. 31, 2019 from U.S. Appl. No. 13/577,233, 19 pages.

Final Office Action dated Mar. 2, 2018 from U.S. Appl. No. 13/577,233, 11 pages.

Non-Final Office Action dated Feb. 9, 2017 from U.S. Appl. No. 13/577,233, 10 pages.

Non-Final Office Action dated Sep. 27, 2016 from U.S. Appl. No. 13/577,233, 11 pages.

Final Office Action dated Oct. 8, 2015 from U.S. Appl. No. 13/577,233, 15 pages.

Non-Final Office Action dated May 19, 2015 from U.S. Appl. No. 13/577,233, 17 pages.

Final Office Action dated Oct. 3, 2017 from U.S. Appl. No. 13/577,233, 15 pages.

* cited by examiner

DETERMINATION OF ROCK TYPES BY SPECTRAL SCANNING

CROSS-REFERENCE TO RELATED APPLICATIONS

This patent application is a continuation of U.S. patent application Ser. No. 16/197,199, filed Nov. 20, 2018, which is a continuation of U.S. patent application Ser. No. 13/577,233, filed Aug. 3, 2012, which is a U.S. National Phase Application under 35 U.S.C. § 371 of International Application No. PCT/AU2011/000117, filed Feb. 4, 2011, entitled DETERMINATION OF ROCK TYPES BY SPECTRAL SCANNING, which claims priority to Australian Patent Application No. 2010900467, filed Feb. 5, 2010.

FIELD OF THE INVENTION

This invention relates to methods and apparatus for the determination of rock types occurring in rock bodies. Such determinations may be made during ore body exploration and surveys or during mining operations in a mine for ore grade assessment.

BACKGROUND OF THE INVENTION

In conventional pit-mining, ore grade assessments are made on the basis of sample material taken from spot locations. Analysis of such material can take many days which can delay the planning of blasting recovery and transport of the ore material. With developments in automated mining techniques there is a need for an improved method for accurately identifying mine geology.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to one aspect, the invention provides a method of identifying rock types in a rock body, comprising scanning a surface of the rock body with a spectral sensor to obtain spectral data from the rock body surface, said spectral data comprising multiple spectra obtained from successively scanned regions of the rock body surface; determining for different spectra a spectral parameter indicative of spectra derived from high angle reflectance; and using data from the spectra so determined not to be derived from high angle reflectance to determine rock types present at said regions of the rock body surface.

Said parameter may be a ratio derived from a comparison of the spectral data at differing specific wavelength bands.

The rock types may be determined from the spectra determined not to be from high angle reflectance by determining for each of said spectra a plurality of further spectral ratios each derived from a comparison of the spectral data at differing specific wavelength bands as indicators of differing rock types.

The spectral ratios indicative of rock types may be determined from spectral data at wavelength bands which are not affected by atmospheric absorptions under natural light illumination.

The invention also extends to a method of identifying rock types in a rock body, comprising scanning a surface of a rock body with a spectral sensor to obtain spectral data from the rock body surface, said data comprising multiple spectra obtained from successively scanned regions of the rock body surface; and determining for differing spectra a plurality of spectral ratios each determined from a comparison of the spectral data at differing specific wavelength bands as indicators of differing rock types.

The rock body may be in a mine and the method may be used to make ore grade assessments of the rock body for mining.

The invention further extends to a method of mining comprising scanning a mine bench face with a spectral sensor to obtain spectral data from a rock body at the bench face, said data comprising multiple spectra obtained from successively scanned regions of the rock body surface; determining for different spectra a spectral parameter indicative of spectra derived from high angle reflectance; using data from the spectra so determined not to be derived from high angle reflectance to determine rock types at said regions of the rock body surface; removing material from the bench; and transporting removed material for processing in accordance with the rock type determination derived from the bench face.

The invention also extends to a method of mining comprising scanning a mine bench face with a spectral sensor to obtain spectral data from a rock body at the bench face, said data comprising multiple spectra obtained from successively scanned regions of the rock body surface; determining for different spectra a plurality of spectral ratios each derived from a comparison of spectral data at differing specific wavelength bands as indicators of differing rock types; removing material from the bench; and transporting removed material for processing in accordance with the rock type determinations.

Said spectra may include spectra in the Visible Near Infrared Range (VNIR) and/or in the Short Wave Infrared Range (SWIR).

The spectral data may comprise reflectance values at differing wavelengths through the spectra.

According to a further aspect of the invention there is provided a method for classifying rock types in a rock body comprising:
  obtaining spectral data from a spectral measurement of a surface region of the rock body;
  determining a first spectral ratio between two wavelength bands of the spectral data; assessing from the first spectral ratio whether the measurement is a high-angle measurement;
  if the measurement is not a high-angle measurement, determining a further spectral ratio between two further wavelength bands of the spectral data; and
  comparing the further spectral ratio with a corresponding diagnostic criterion to assess whether the surface region comprises a first rock type associated with the further spectral ratio and diagnostic criterion.

Further aspects of the present invention and further embodiments of the aspects described in the preceding paragraphs will become apparent from the following description, given by way of example and with reference to the accompanying drawings.

In order that the invention may be more fully explained, results are also provided of its application to determination of rock types in a project to determine how spectral data can be used to accurately identify the rock types of the West Angelas mine, located in the Eastern Pilbara region of Northern Western Australia.

As used herein, except where the context requires otherwise, the term "comprise" and variations of the term, such as "comprising", "comprises" and "comprised", are not intended to exclude further additives, components, integers or steps.

DETAILED DESCRIPTION OF THE EMBODIMENTS

To achieve an automated mine, a fast and objective method of assessing the geology of exposed mine faces is needed. One method described herein is the use of spectral data.

Reflectance and emittance spectroscopy techniques can be used to obtain information regarding the chemical composition of an object or material. An advantage of spectroscopy is that it can be used at close or far range.

One object that may be analysed by using spectroscopy is a rock body. While the variations in material composition often cause shifts in the position and shape of spectral features and the spectral features to be examined in an ore body can be quite complex, spectroscopy still has great potential to estimate and classify key geological properties such as rock type and/or ore grade.

Spectral data can be used to distinguish different rock types. Specific absorption features can be associated with certain minerals and can be used diagnostically to identify the minerals present. Both spectral ratios and hyperspectral classification are techniques that can be used to classify rock type for an automated mine.

Hyperspectral images are produced by imaging spectrometers or hyperspectral cameras. Hyperspectral sensors collect data in hundreds of bands. These measurements produce a continuous spectrum that, after adjustments and corrections, can be compared with libraries of reflectance spectra. Typically, hyperspectral cameras collect all spectra across a spatial line in the image and scanning is required in order to build up a spectral image. By using an imaging spectrometer or hyperspectral camera in conjunction with a geometry scanner (such as a laser scanner used for Light Detection and ranging (Lidar) scanning) it is possible to build a geological map and model of a scanned terrain such as a mine bench face.

Hyperspectral imaging provides narrow spectral bands over a continuous spectral range. On the other hand, multispectral imaging provides several images at discrete and narrow bands, and does not produce the entire spectrum reflected by an object. An example of a multispectral system is Landsat, or the FluxData FD-1665 multispectral camera.

Multispectral spectrometers are more economical to use than hyperspectral spectrometers. However, multispectral images do not include as much information as hyperspectral images. Nevertheless, if the measured wavelength bands correspond to characteristic reflectance behaviour of the relevant material, wavelength ratios can be extracted from the multispectral data and can be used to identify rock types.

Spectral ratios provide quantitative and objective sample classification, which may be more accurate and consistent than subjective visual classification. Spectral data may contain more information than can be observed by visual inspection. Improved classification can lead to greater efficiencies in mining as the location of ore and waste can be more accurately defined. Also, using spectral ratios may provide automated mining with an automated classification technique that is objective and that can be completed in real-time. Once rock types have been determined based on spectral ratios, the material may be removed from the bench and then transported for processing according to the rock type as determined.

1. System Overview

Figure 1:
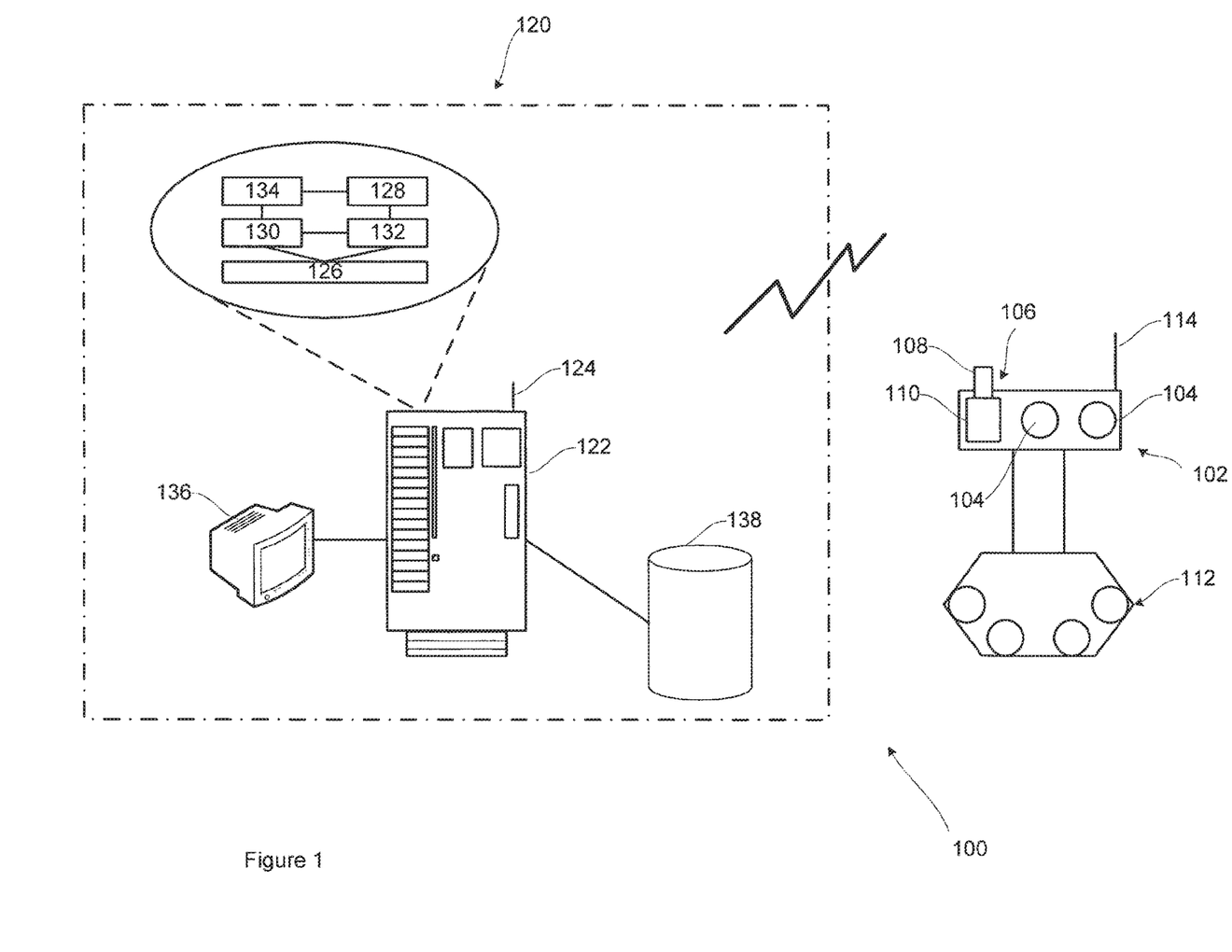
FIG. 1 is a schematic of a system for determination of rock types by spectral scanning.

With reference to FIG. 1, there is shown a system 100 in which the rock classification methods described herein may be implemented.

The system 100 comprises a scanning module 102 which, in this case, includes two spectral cameras 104 arranged to take spectral measurements of an area of interest. These spectral cameras can be hyperspectral cameras. For example, for examination of iron ore bodies it has been found that Neo HySpex VNIR and SWIR cameras having the following characteristics are suitable.

| Sensor | VNIR 1600 | SWIR 320 m |
|---|---|---|
| Spectral range | 0.4-1 μm | 1.3-2.5 μm |
| Spatial pixels | 1600 × 1200 | 320 × 256 |
| # bands | 160 | 256 |
| Digitisation | 12 bit | 14 bit |

The VNIR camera may be used to detect iron ore whereas clay minerals can be detected by SWIR images. Different cameras may be used either alone or in combination depending on the nature of the data desired.

Alternatively, the spectral cameras can be multispectral cameras, such as the Landsat multispectral scanner (MMS), or the FluxData FD-1665 multispectral camera.

The scanning module 102 may also include a geometry scanner 106 (such as a Riegl LMS-Z420i laser scanner) for taking measurements relating to geometrical characteristics of the region of interest. The geometry scanner 106 may include an RGB camera 108 and a range scanner 110.

The scanning module 102 is coupled to a mobile vehicle 112 which may be a self-propelled vehicle or may be a trailer or similar to be towed behind a prime mover. The vehicle or prime mover may be directly controlled by a driver, under remote robotic control, or may be an autonomous (i.e.

artificially intelligent) unit. The vehicle 112 carries a transmitter 114 for transmitting measurement data from the spectral cameras 104 and geometry scanner 106 to a processing station 120. In one embodiment the measurement data is transmitted using standard radio frequency protocol.

In an alternative arrangement, the spectral image is obtained scanning drilled sample material in a laboratory or other offsite setting. In this case the spectral data may be uploaded to the processing station 120, for example by connecting the cameras directly to the computing system 122.

More specifically, an ASD FieldSpec® 3 hyperspectral spectrometer may be used which consists of three calibrated spectrometers that have a total spectral range of 0.350 to 2.500 µm. The spectra may be taken at a height of 15 cm using an eight degree field of view. This will result in the spectrum being an average of the material within a 2 cm diameter area. Either natural light or artificial light can be used when the images are taken. A halogen lamp may be used as the light source if an artificial light source is employed. Allowing the lamp to warm up before the spectra are recorded reduces the variation in the light source.

Before each spectrum is collected, a spectrum of a white spectralon® plate may be taken under the same conditions. The spectrum is then calibrated to reflectance using a ratio of the spectrum to the Spectralon® reference spectrum. The spectrum is then calibrated to absolute reflectance using the reflectance characteristics of the reference plate.

The processing station 120 is in the form of a remotely located computing system 122 including a receiver input 124 which can be wired or wireless. The computing system 122 is operable to process the measurement data gathered by both the cameras 104 and geometry scanner 106 so as to produce geological survey data.

The data is subsequently processed by the computing system 122 in order to determine the composition of the material of which a spectral image was taken. The computing system 122 may employ standard computer hardware such as a motherboard 126, a central processing unit 128, a random access memory 130, a hard disk 132, and networking hardware 134. In addition to the hardware, the system 120 includes an operating system (such as the Microsoft Windows™ XP Operating System, which is made by Microsoft Corporation) that resides on the hard disk 132 and which co-operates with the hardware to provide an environment in which the software applications can be executed. The processing station 120 further includes a visual display unit 136 and a database 138 for storing the measured data and computed spectral and material characteristics.

In one embodiment, the spectral information could be processed automatically using a program such as Matlab running on the computing system to rapidly produce real-time rock classifications.

In a further arrangement the spectral information may be processed on a computing system mounted on the vehicle 112.

2. Method Overview

Figure 2A:
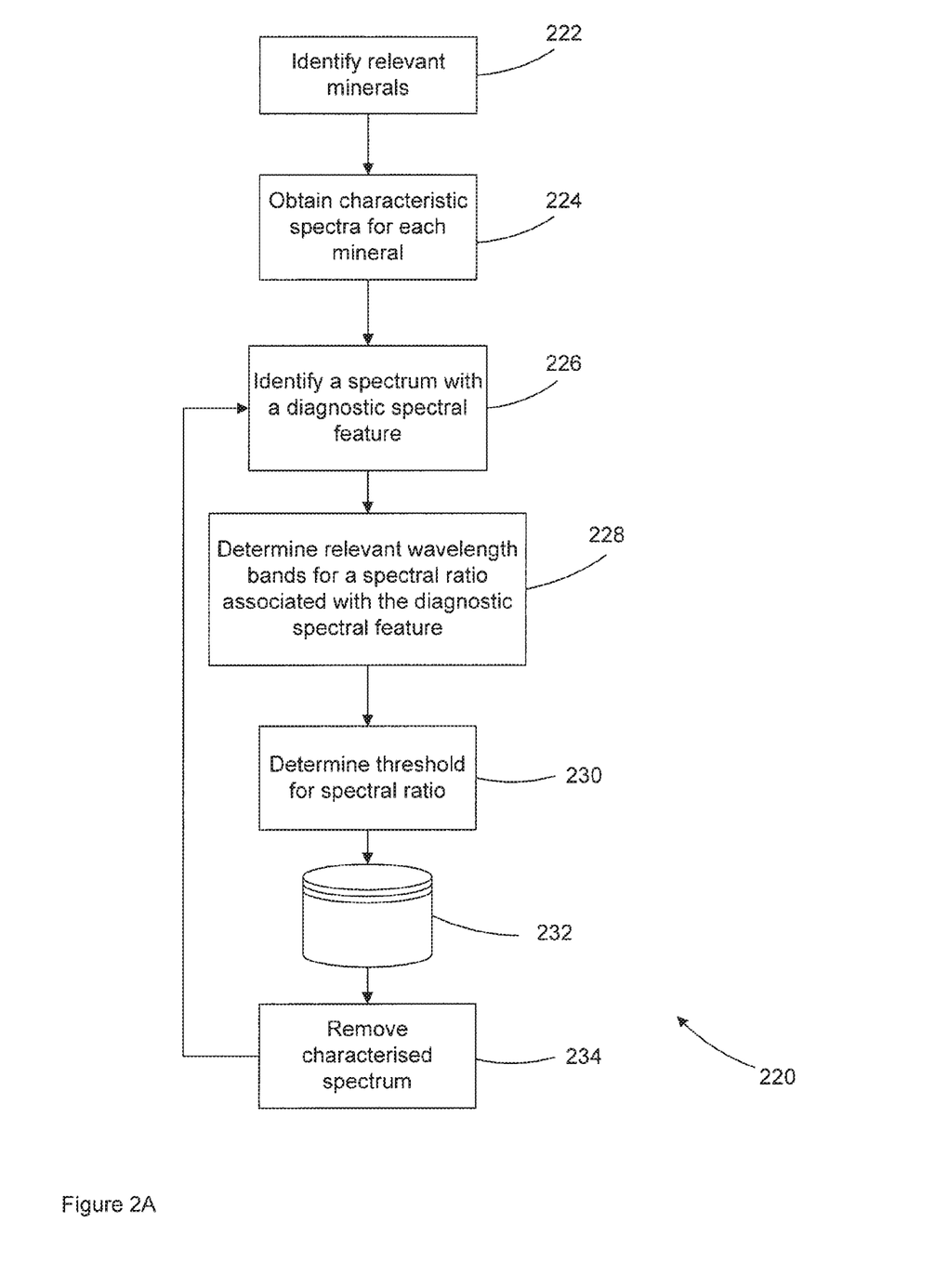
FIG. 2A is a block diagram showing method steps for determining classification criteria.
Figure 2B:
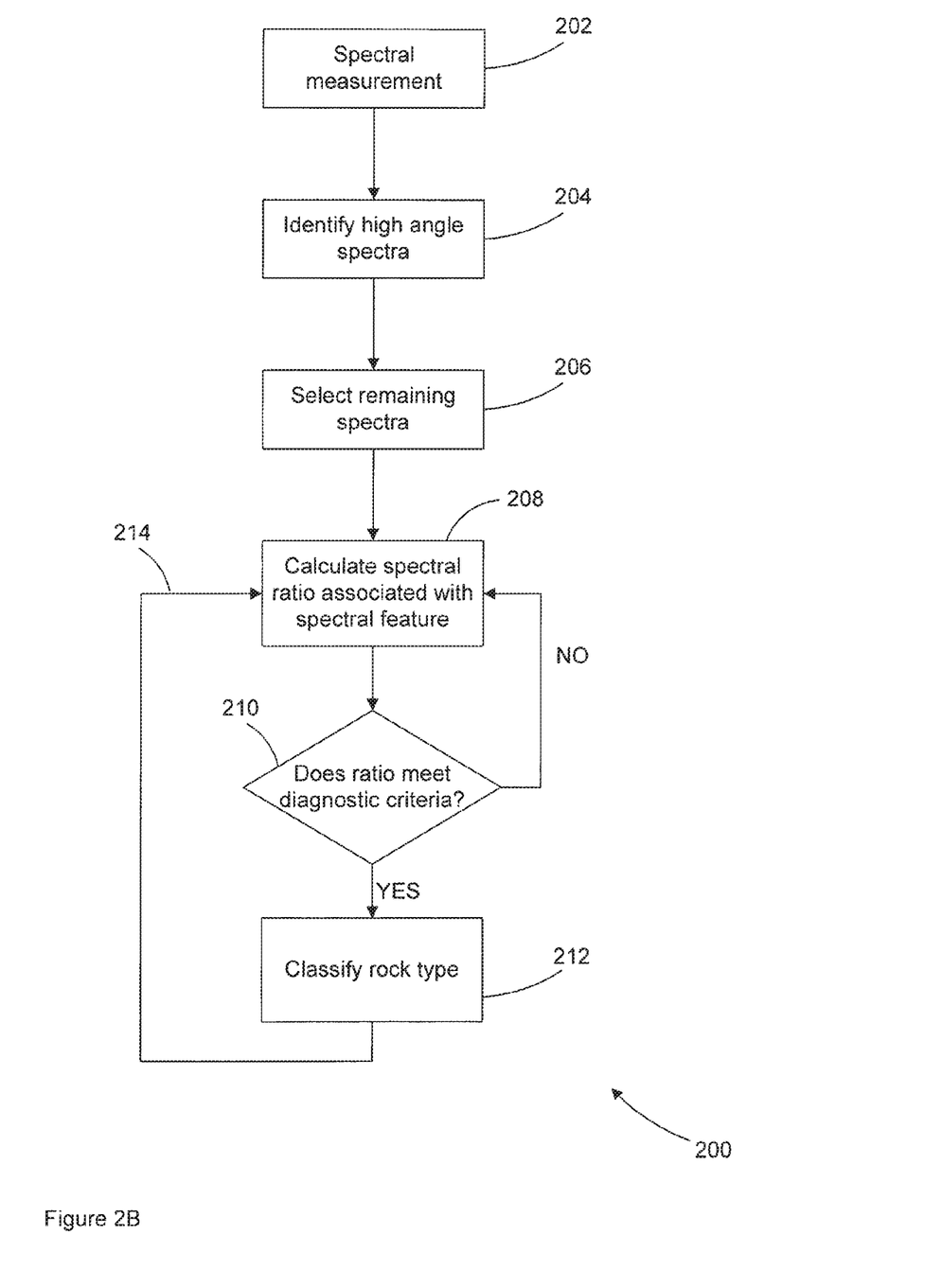
FIG. 2B is a block diagram showing method steps for classifying rock types.

FIGS. 2A and 2B outline two processes that are used in the rock type classification as described herein. First, suitable classification criteria are determined for an application, and then these criteria are used to perform the rock type classification.

2.1 Determining Classification Criteria

With reference to FIG. 2A, the method 220 for determining classification criteria is typically performed offline. The method 220 will be performed for each area of interest where rock type classification will be performed.

One particular example discussed below is the identification of ores from the West Angelas Mine located in the Eastern Pilbara in northern Western Australia. The geology includes shales, martite/goethite ore zones and banded iron formations (BIF). It will be appreciated that the methodology is also applicable to the identification of minerals in other ore bodies.

Figure 3:
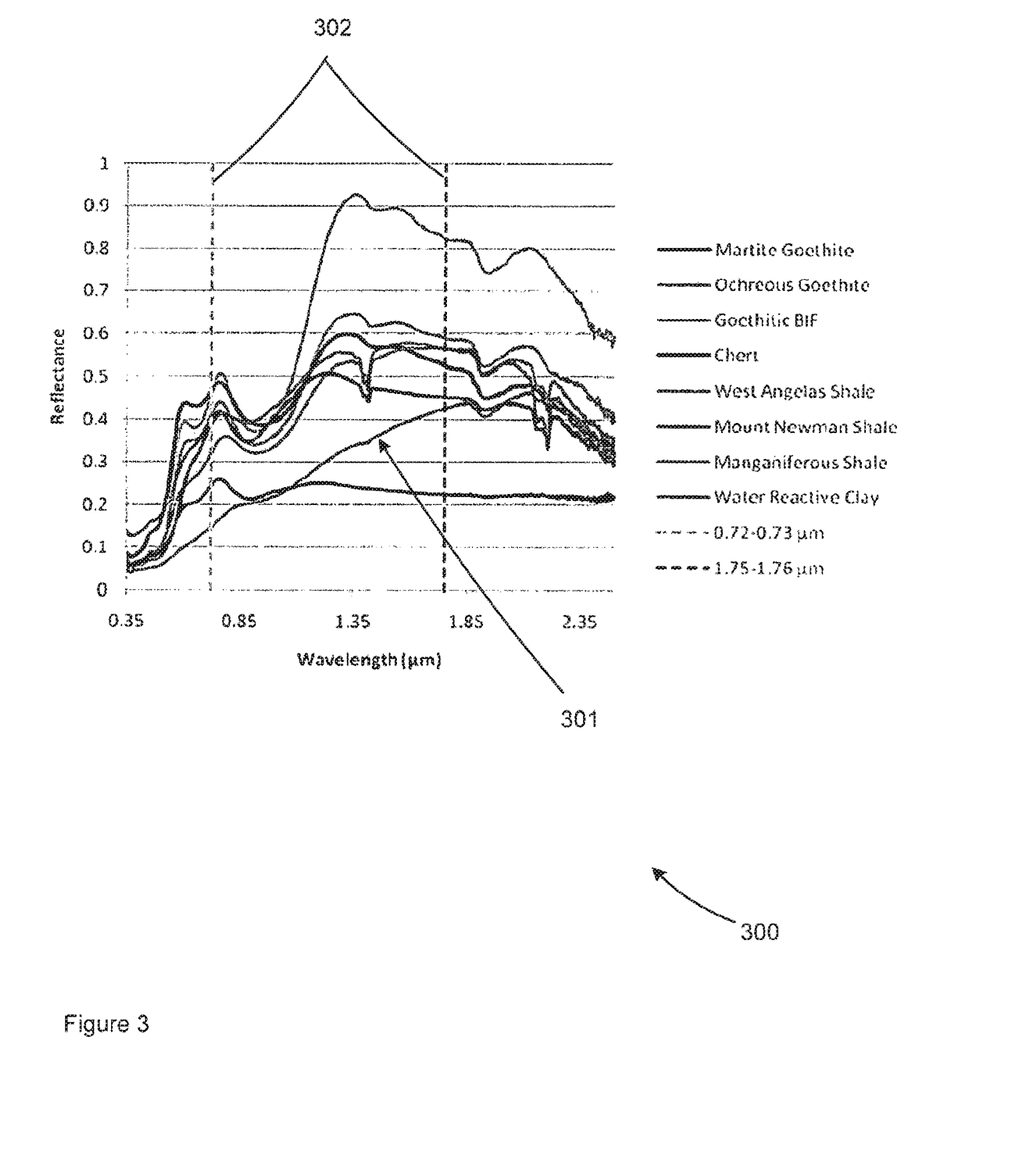
FIG. 3 is a graph of the spectra of a group of material present in an ore body, and the manganiferous shale ratio used to distinguish manganiferous shale from the other material.

At step 222 the relevant minerals that are present in the area of interest are identified. For the West Angelas Mine example, these minerals are the shales, martite/goethite ores and BIF. At step 224 the characteristic spectra for each mineral are obtained, for example by scanning samples of these minerals to produce spectral images. FIG. 3 is an example of the spectra 300 of the group of minerals present in the West Angelas Mine.

At step 226 a spectrum (or group of spectra) is identified that has a diagnostic spectral feature. A diagnostic spectral feature is a spectral feature that is characteristic for a specific material or group of materials. This is, for example, an absorption feature at a specific wavelength. For the spectra 300 shown in FIG. 3, one such diagnostic spectral feature can be seen in the manganiferous shale spectrum 301 that has a characteristic drop in reflectance towards the lower wavelengths. Relative absorption band depth analysis may be used to characterise this spectral feature.

At step 228 two wavelength bands are identified that are associated with the identified diagnostic spectral feature, and which define the wavelengths used for determining a spectral ratio. For the manganiferous shale spectrum 301, the two wavelengths 302 (or wavelength bands) are 1.750 to 1.760 µm and 0.720 to 0.730 µm. The ratio obtained by dividing the sum of the reflectance for 1.750 to 1.760 µm by the sum of the reflectance for 0.720 to 0.730 µm (the so-called manganiferous shale ratio) can be used to distinguish manganiferous shale from the other rock types in the group.

Figure 4:
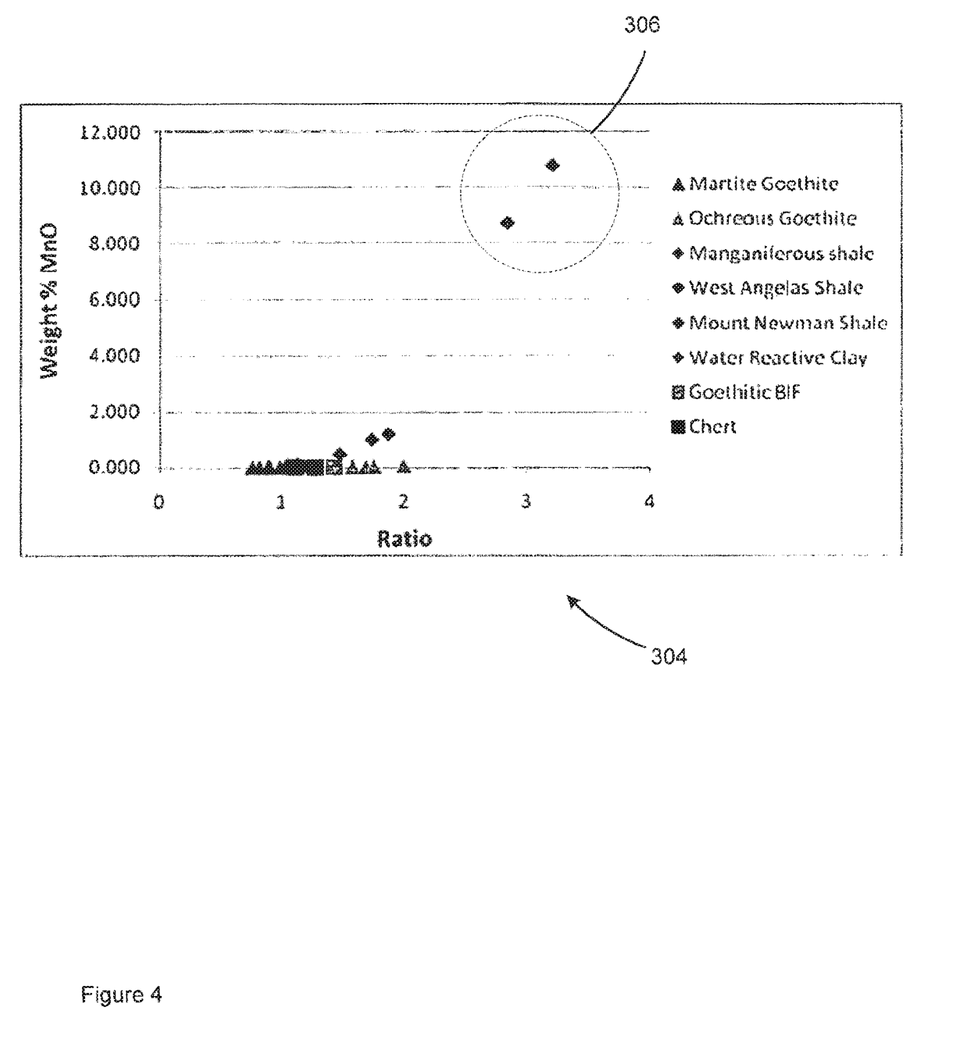
FIG. 4 is a graph illustrating how a manganiferous shale spectral ratio can be used to distinguish rock type.

At step 230 a diagnostic criterion is determined for use in classification with the spectral ratio. In one arrangement a threshold value is identified for the spectral ratio. When a spectral ratio is determined for all the spectra at the relevant wavelengths, the specific mineral or group of minerals will have a certain, distinctive ratio. For example, for the wavelength bands 1.750 to 1.760 µm and 0.720 to 0.730 µm, manganiferous shale can clearly be distinguished as can be seen in FIG. 4 where the calculated ratios are plotted against the weight percent of manganese oxide for the rock types in the group. If a ratio higher than 2.4 is obtained for a ratio between these two wavelength bands, then the material can be classified as manganiferous shale, and a rock with a ratio lower than 2.4 is not manganiferous shale. A suitable threshold for the manganiferous shale ratio is therefore 2.4.

At 232 the identified wavelength bands and the ratio threshold for a specific mineral (or group of minerals) are saved. The process flow then returns to step 226 to look iteratively for diagnostic spectral features that may be used to classify other minerals in the group. The spectra for the rock types characterised by the ratio determined in step 228 (for example the manganiferous shales) are removed from the group of characteristic spectra at step 234. This step makes it easier to distinguish between the remaining minerals.

Figure 6A:
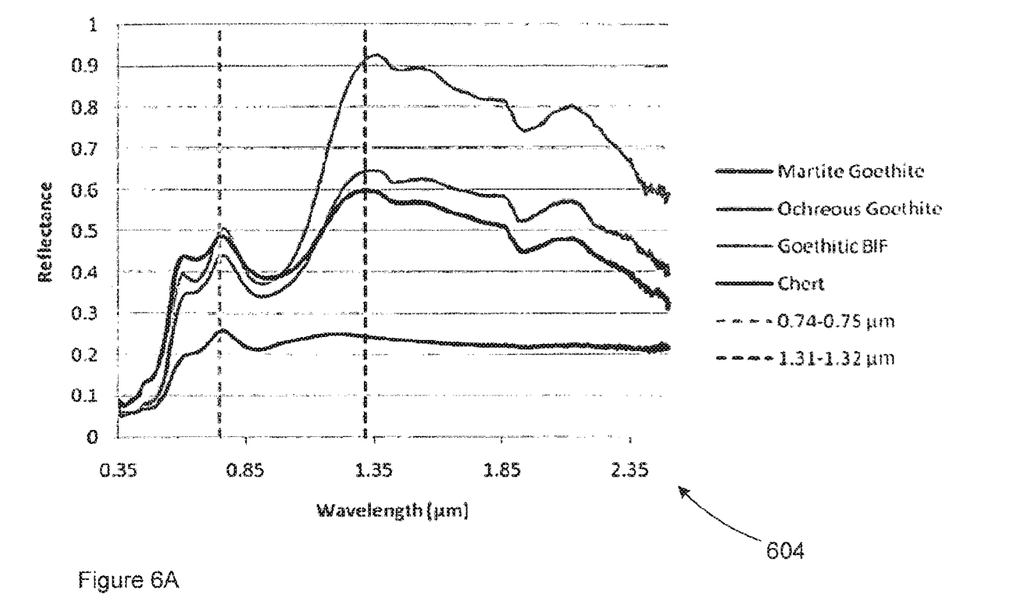
FIG. 6A shows a plot of a diagnostic spectral feature for chert.
Figure 6B:
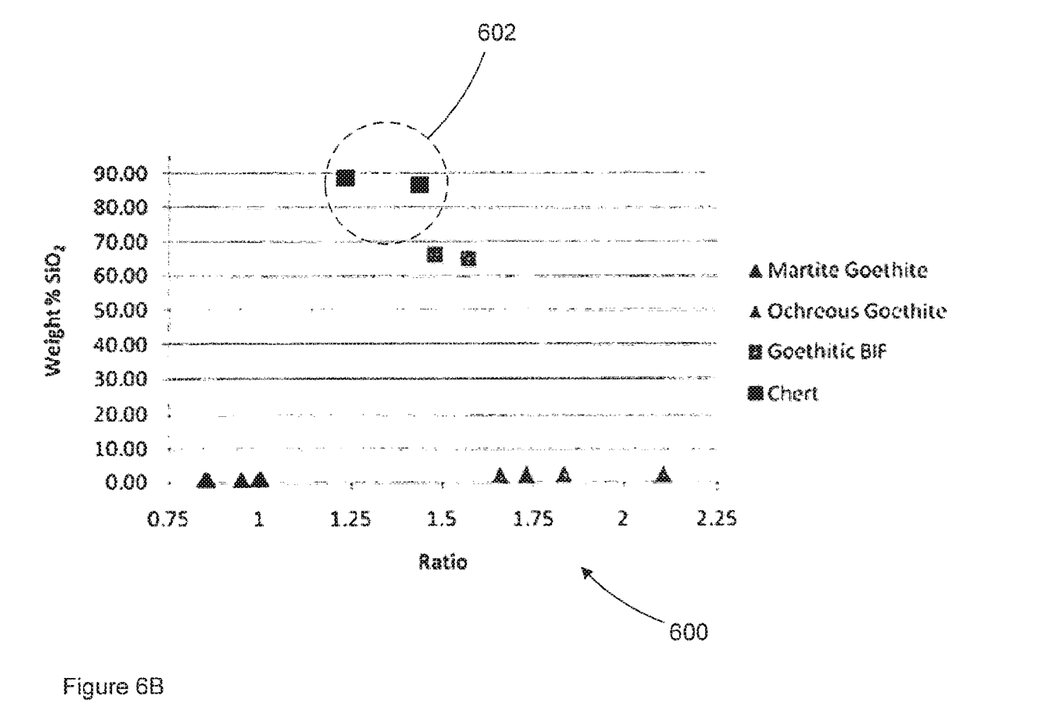
FIG. 6B shows a plot of the chert spectral ratio plotted against the weight percent of $SiO_2$.

The application of method 220 to the West Angelas example is further discussed in section 8 below, with reference to FIGS. 6, 7A and 7B. The West Angelas rock types may be distinguished using four spectral ratios.

2.2 Rock Type Classification

The spectral ratios determined in method 220 may be used in method 200 to provide a rapid diagnostic technique to provide a quantitative classification of mine lithologies.

With reference to FIG. 2B, the system 100 shown in FIG. 1 may be used in method 200 to determine rock types present in an area of interest.

The cameras 104 are used to record the spectral reflectance in an area of interest, for example scanning a surface of a rock body to obtain spectral data from the rock body surface. The multiple spectra obtained from successively scanned regions of the rock body surface in spectral measurement step 202 may be recorded in the database 138 of the processing station 120. For example, n different spectra may be measured.

The computing system 122 then inspects the stored spectral data and at step 204 determines if any of the spectra correspond to high angle measurements. There may be, for example, m different spectra corresponding to high angle measurements. These measurements do not provide an accurate portrayal of the spectral characteristics of the material, and therefore at step 206 the remaining spectra are selected, that is the spectra that do not correspond to high-angle measurements. The remaining data is used for identifying rock types present in the scanned regions of the rock body surface.

At step 208 the remaining (i=n−m) spectra are considered, and ratios are calculated for the wavelength bands associated with diagnostic spectral features of the rock types present in the ore body. The wavelength bands used are those determined in method 220.

As described above, multiple spectra are obtained at step 202, and high angle measurements are removed from the group of spectra. However, the method can also be performed on a single measurement. If one spectrum is obtained at step 202, then that spectrum is inspected at step 204 to determine if it is a high angle spectrum. If it is, then the process ends and no classification is done. If it is not, then the process proceeds to step 208.

At step 210 a calculated ratio is compared to the corresponding threshold value for the specific rock types. These are the threshold values as determined in step 230 in FIG. 2A. If the ratio meets the diagnostic criteria, then the rock type can be classified at step 212.

As shown by arrow 214 this process may be a sequential, iterative process, i.e. after considering the ratio for one rock type (or mineral group) and completing the classification for that rock type, then steps 208 to 212 may be repeated for a next rock type based on a different ratio and its corresponding classification threshold. However, the order of the steps can be different, for example a form of batch processing may be done: all the relevant ratios for a spectral measurement may be determined, and then following this step the calculated ratios may be sequentially compared to all the relevant threshold values in order to classify the rock types. The order of classification may be the same as the order established in the iterative analysis of steps 226, 228, 230 and 234.

Appendix 1 shows an example of a Matlab script that may be used to identify rock types from a mineral spectrum. The script may, for example, run on computing system 122 or on a computing system on the vehicle 112. The spectrum is input in a file with wavelength in a first column and reflectance in a second column. The script then extracts the values in the six spectral ranges required and sums the values. The spectral ratios are calculated and are sequentially used to classify the spectrum as manganiferous shale; shale or water reactive clay; martite goethite; ochreous goethite; or chert rich. The ratio values used for the classification are discussed with reference to FIGS. 3, 4, 6A, 6B, 7A and 7B.

The process may also record the location at which each of the spectral measurements was captured.

3. Spectroscopy

Spectroscopy is the study of light that has been emitted, reflected or scattered from a solid, liquid, or gas. When photons enter a mineral they are either absorbed, reflected from grain surfaces or refracted through the mineral. The photons that are reflected or refracted are called scattered. Some of these photons are scattered away from the surface and can be detected. The wavelengths of light which are absorbed depend on the material. For example in the case of a rock, a scattered spectrum contains information about abundance of constituent minerals, chemical composition and structure. Photons are also scattered off the surface by specular effects without interacting with the material. These photons do not contain information about the material and form a low background spectrum that typically has a slight effect on the depth of the absorption bands.

The light scattered from the material can be recorded using a spectrometer that records light across a large number of continuous bands. These bands are narrow and, ideally, are the same spectral width for the entire range measured. Some systems, such as the Landsat Thematic Mapper (TM) and the MODerate Resolution Imaging Spectroradiometer (MODIS), have only a few broad bands that are widely spaced and therefore are not considered spectrometers.

Spectroscopy can be used to obtain geological information from samples in the laboratory, or in natural settings via imaging spectrometers that are used in the field, mounted on aircraft or on satellites. Advantages of using spectroscopy include sensitivity to crystalline and amorphous materials and its usefulness for both close and distant objects. No sample preparation is needed and the technique is non-destructive. Some minerals can be identified by diagnostic absorption features. Therefore spectroscopy can be used to obtain information about the mineral composition of rocks and identify them from remotely obtained data. Also, a continuous data set can be obtained, allowing large areas to be studied and compared. However, not all minerals have diagnostic absorptions and some minerals, for example quartz, only have diagnostic absorptions outside of the visible near infrared (VNIR) and short wave infrared regions (SWIR) normally used.

Absorption bands are caused by electronic and vibrational processes inside materials. The electronic processes are due to the absorption of a photon by an atom or ion, which is shifted to a higher energy state as a result. A lower energy state is then achieved by releasing a photon, usually at a different wavelength. This process can cause heating of the material. Electronic absorption bands can also occur when the absorption of a photon causes an electron to move between ions or into the conduction band where it can move freely through the lattice. The crystal structure varies from mineral to mineral and this produces the characteristic absorption features. Vibrational absorption occurs when a lattice molecule absorbs the energy of a photon and converts it to vibrations. For minerals, electronic processes produce very wide bands that are mostly in the ultraviolet or visible regions. Their frequency decreases through the visible range and there are very few in the infrared range. Usually electronic transfers are not seen at wavelengths longer than the iron band at 1 μm. Vibrational processes require less energy and produce sharper bands that occur at wavelengths greater than 2.5 μm. Therefore, in the SWIR and VNIR, there are no fundamental vibrational bands but only bands that are harmonic systems. These are overtones or combinations of the fundamental bands in the mid and far infrared. The intensity and frequency of these bands decrease towards the visible range as the probability of the required combination occurring decreases. Some minerals, especially halides, display spectral features that cannot be explained by their composition and are instead caused by colour centres in imperfect crystals. When these crystals are irradiated their electrons are excited, but instead of returning to the positively charged holes after the irradiation is removed, they can become bound to the defect.

When spectra are taken using natural light the atmospheric absorptions should be considered, as these affect the spectra. The main absorptions in the VNIR and SWIR are caused by water and occur at 1.13, 1.4 and 1.9 µm. Other atmospheric absorptions are caused by oxygen at 0.76 µm, and $CO_2$ at 1.57, 1.61, 2.01, and 2.06 µm. However, when artificial light is used these atmospheric absorptions are not present and these regions of the spectrum can be used to obtain information. For example, hydroxyl groups have similar absorptions to water but do not absorb at 1.9 µm. Therefore a spectrum containing only the 1.4 µm absorption indicates hydroxyl, but a spectrum with absorptions at 1.4 and 1.9 is indicative of water.

When a pixel contains multiple minerals the spectrum produced is a mixture of the spectral features of all the minerals in the pixel. The mixing can be either linear or non-linear depending on the size of the minerals. Linear mixing occurs when each photon only interacts with one mineral type. The spectrum produced is a sum of the spectra produced by each type. The amount of influence each mineral type has on the spectrum is proportional to the area it covers within the pixel. Non-linear mixing occurs when each photon can interact with multiple mineral types and produces a more complex spectrum that is not a linear combination of the mineral spectra. Minerals generally create a non-linear mixture due to the small grain size.

Spectroscopy is sensitive to changes in the crystal structure or chemistry of a material, which can cause very complex spectra in natural materials such as rocks. Mixtures generally do not have a linear effect on the spectra. As the photons contact multiple minerals there is a high probability that, when there is a mixture of light and dark grains, a photon will interact with a dark grain. As the dark grain will have a higher absorption a small percentage of dark grains can reduce the reflectance of the spectra by much more than their weight percent. The grain size also affects the amount of light scattered and absorbed as it depends on the volume to surface ratio. A small grain has more surface area to reflect from and a shorter internal path, which reduces absorption. The spectra of a material can also be affected by a mineral which does not have absorption features in the observed wavelengths. For example, quartz does not have absorption features in the VNIR or SWIR wavelengths but increases the overall reflectance of the spectrum. Impurities from trace elements are commonly found in minerals and these can have a large effect on the spectra of the mineral. This is especially noticeable in the visible wavelengths.

The data from a spectrometer is controlled by its spectral range, spectral bandwidth and spectral sampling. The spectral range needs to cover enough diagnostic features to be capable of identifying the materials present. Two ranges used in remote sensing are the visible near infrared (VNIR), covering 0.4 to 1.0 µm, and the short wave infrared (SWIR), covering 1.0 to 2.5 µm. The spectral bandwidth is the width of each individual spectral band in the spectrometer. A narrower spectral bandwidth allows for narrower absorption features to be detected, if there are sufficient adjacent spectral samples. Bandwidths greater than 25 nm lose the ability to resolve important mineral absorption features. More fine detail will be observed with narrower bandwidths, for example 5 µm. The shape of the bandpass for the spectrometer band is commonly Gaussian. The width of the bandpass is defined as the width, in wavelength, at half the maximum response of the function, called the full width half maximum (FWHM). Spectral sampling is the distance, in wavelength, between the spectral bandpass profiles for each spectrometer band. Spectral sampling can be combined with the spectral bandwidth to give resolution. The spectral resolution is limited by the amount of light available. As the bands become narrower the amount of light received by each channel is reduced, generally increasing the signal to noise ratio (S/N ratio). The S/N ratio must be large enough that the spectral features studied can be distinguished from the background. The ratio required therefore depends on the strength of the spectral feature. The ratio also depends on the detector sensitivity, the spectral bandwidth and the light intensity being measured.

5. Spectral Ratio Comparisons

Mine rock type classifications are based on chemical and mineralogical criteria, but during operation subjective visual classifications are often used. In an automated mine, this is not possible and another technique must be employed. Spectral ratios provide a rapid diagnostic technique to provide a quantitative classification of mine lithologies. Spectral ratios require only multispectral systems, not hyperspectral systems. This reduces the amount of data produced and therefore the amount of processing and data transmission required.

Hyperspectral data contains the most information about the material scanned. However, while the extra data is beneficial when undertaking research, the entire data set is not necessarily required in working mine conditions, where fast and easily acquired data is better. Therefore a multispectral system using spectral ratios may have an advantage over a hyperspectral system.

Hyperspectral files are large, especially when scanning bigger areas. This makes the processing slow. Additionally, in an automated mine, all data would be sent from the spectral system to the operations centre. The transfer of very large amounts of data could cause difficulties in this process. Spectral ratios only require certain bands to be scanned and therefore produce a much smaller data set. The ratios could be easily and quickly processed on site by a computer connected to the spectral system. The final classification would then be the only information sent to the operations centre.

The characteristic spectral features of the different minerals can be used to identify the rock type. One method of comparing two spectra is relative absorption band depth analysis. This involves taking a ratio using a point in the spectrum which corresponds to an absorption feature of interest. Several bands near the shoulder of an absorption band are summed and divided by the sum of several bands near the minimum of the absorption feature. This gives a relative absorption depth which can be used to detect diagnostic mineral absorption features with less interference from the background reflectance.

In the ore body considered, manganiferous shale has a spectrum which is distinctly different from the other rocks. Referring to FIG. 3, manganiferous shale 301 has a steady decrease in reflectance towards the lower wavelengths. This spectral feature can be described using a spectral ratio between the wavelength bands 302, namely 1.750 to 1.760 µm and 0.720 to 0.730 µm. The ratio obtained by dividing the sum of the reflectance for 1.750 to 1.760 µm by the sum of the reflectance for 0.720 to 0.730 µm (manganiferous shale ratio) can be used to distinguish manganiferous shale from other rock types. Referring to FIG. 4, when this ratio 304 is plotted against the weight percent of manganese oxide, it can be observed that the manganiferous shale 306 is distinct from the other rock types. Therefore, if a rock has a ratio higher than 2.4 it can be confidently classified as manganiferous shale, and a rock with a ratio lower than 2.4 is not manganiferous shale.

When an absorption feature is particularly well defined, such as the halloysite features, they can be used to predict the concentration or weight percent of a compound in the rock. Spectral ratios can therefore be used to distinguish different rock types.

The spectral ratios determined for the different rock types can be used to identify rock types from a mineral spectrum. The manganiferous shale ratio (1.750 to 1.760 µm/0.720 to 0.730 µm), the shale ratio (2.220 to 2.230 µm/2.200 to 2.210 µm) and the 1.727 µm/1.016 µm ratio may be used. To reduce the effect random error has on the ratio, the 1.727 µm/1.016 µm ratio can be expanded to be the sum of the reflectance for 1.720 to 1.730 µm divided by the sum of the reflectance for 1.010 to 1.020 µm.

With reference to FIG. 2B, the reflectance at each wavelength of the spectra remaining after step 206 is evaluated by the processing system 120. Spectral ratios are calculated according to the positions of the characteristic (or "strong") spectral features as described above. These ratios are then used to classify the spectrum as manganiferous shale; shale or water reactive clay; martite goethite; ochreous goethite; or chert rich. The ratio values used for each of these are those listed above.

When a spectrum is taken under natural light, some wavelengths are absorbed by the atmosphere. This results in the spectrum containing no data at certain wavelengths. For example, the absorbed wavelengths overlap the clay absorption features at 1.4 µm. Therefore, when choosing wavelengths for spectral ratios it is useful to choose wavelengths which are not affected by the atmospheric absorptions.

In mine conditions atmospheric absorptions must be considered because scanning will probably not be done using artificial light. The main absorptions are those from water at 1.4 and 1.9 µm. Other atmospheric absorptions are due to oxygen at 0.76 µm, and $CO_2$ at 1.57, 1.61, 2.01, and 2.06 µm. The spectral ratios used to identify material should therefore be chosen so that they do not overlap these absorption features. If this is done, then atmospheric absorptions will not affect the spectral ratio classification.

Many rock types can be effectively classified using spectra taken with natural light. This means that the method of using spectral ratios as described herein can be used in an outdoor setting such as a mine.

6. Edge Effects

The orientation of a scanned surface to both the light emitting source and the receiving spectrometer has an effect on the spectrum obtained. The amount of direct and indirect light on a scanned drill core also influences the spectrum produced. The centre of the core has the most direct light and the component of indirect light increases towards the edge. These effects cause difficulties in classifying the edges of the cores when using the spectral angle mapper.

When spectra are taken at a high angle, absorption features occur where the spectrum has a lower reflectance at certain wavelengths. These absorptions cause the spectra to be incorrectly classified. Data taken at a high angle can be identified by a ratio such as the edge anomaly ratio (1.520 to 1.540 µm/0.700 to 0.720 µm). This data can then be discarded to prevent incorrect classifications.

To illustrate the extent of the effect that the angle has on the spectrum scanned, three regions on Specim core scans can be considered. The areas that the cores were from appeared visually homogenous in ochreous goethite, martite goethite and water reactive clay. For each region areas of approximately 100 pixels were chosen, one in the centre of the core, one near the edge of the core and one in the middle of the other two spectra. The averages of these areas were taken and the resulting spectra compared. The middle and edge spectra were each divided by the centre spectrum and the log was taken of the resulting ratio. This value shows the difference between the spectra, where a result of zero indicates that the spectra are identical.

Figure 5:
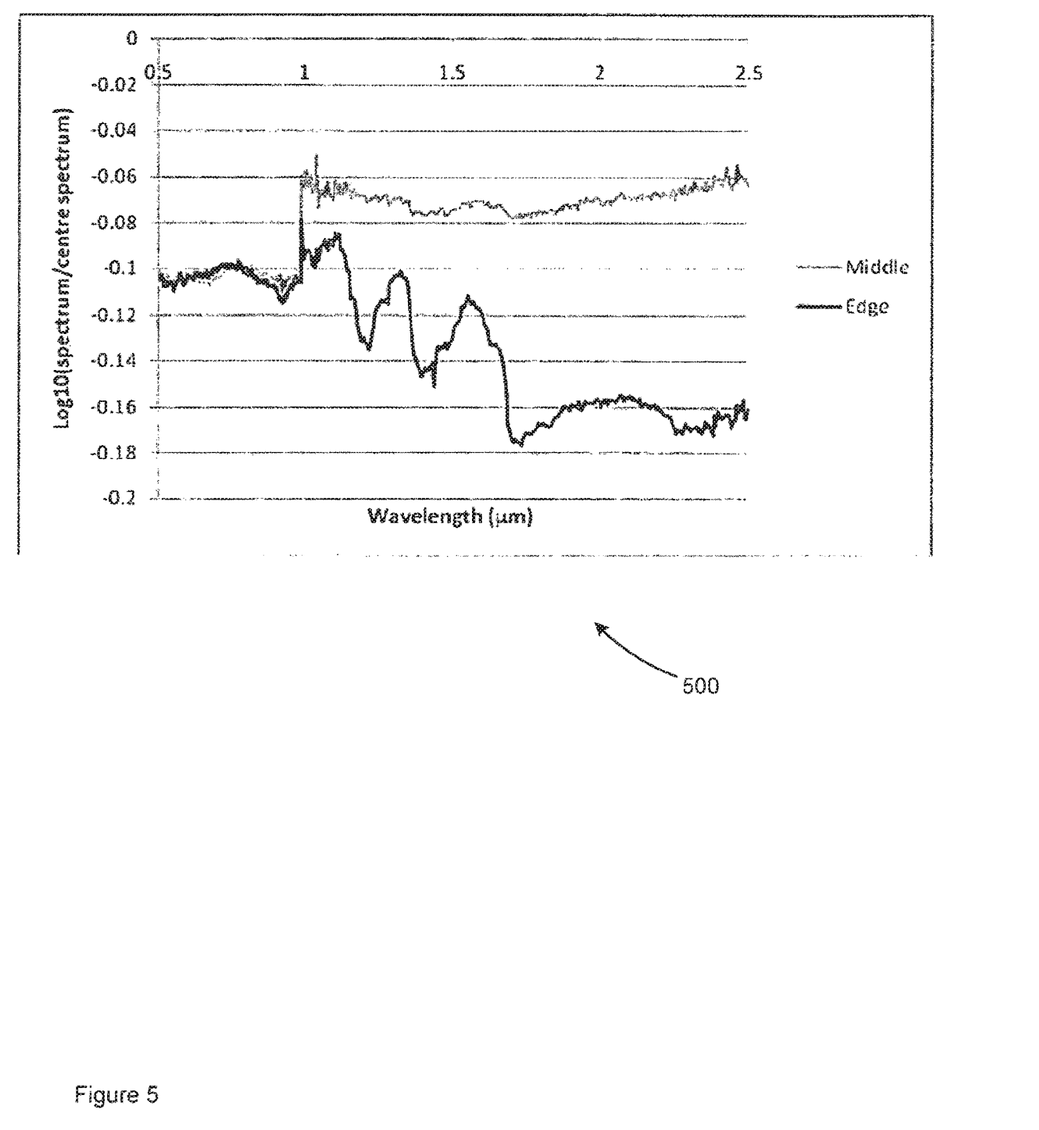
FIG. 5 is an example of a spectral comparison between a middle and an edge spectral measurement.

Referring to FIG. 5, the ochreous goethite spectra show the expected overall decrease in reflectance away from the centre. However, there is also a change in some of the spectral features. This is seen clearly in the spectral comparison 500 in FIG. 5. The middle spectrum has a lower reflectance which is mostly steady for both the VNIR and SWIR regions. The spectral jump between the two spectral systems can be observed at approximately 1 µm. At the wavelengths near the ends of both spectral systems there is an increase in the noise which has a relatively large effect on the spectral comparison, but has no spectral significance. The edge spectrum is very similar to the middle spectrum in the VNIR, but has a very different SWIR spectrum. There are three absorptions around 1.2, 1.4 and 1.7 µm and an overall decrease towards longer wavelengths. The absorptions are not true absorptions but represent areas where the edge spectrum has a lower reflectance than the centre spectrum. These features have a large effect on the spectral angle mapper classification as it changes the overall shape of the spectrum.

The absorption features identified in the edges of the cores may be used to distinguish data from high angles on both cores and pit walls. This data could then be discarded, reducing the amount of incorrectly classified rock. The spectral ratio obtained by dividing the sum of the reflectance for 1.520 to 1.540 µm by the sum of the reflectance for 0.700 to 0.720 µm (edge anomaly ratio) is one possibility. When this ratio is calculated for the spectra used above it is observed that the centre spectra have a ratio close to zero and the ratio increases towards the edge. Spectra with a ratio greater than 1.1 could be considered to be from a high angle, and discarded. This ratio may, for example be used in step 204 of method 200.

7. West Angelas Example

The system and method described above was used on rock samples from the West Angelas mine in the Eastern Pilbara in northern Western Australia.

7.1 Multispectral Images and Spectral Ratios

Method 220 was applied to the West Angelas ore body as follows. The important lithological end members for the West Angelas Mine were visually identified and representative areas of core were chosen (step 222). For step 224, two individual spectra from each of these areas were taken using an ASD FieldSpec® 3 spectrometer, which consists of three calibrated spectrometers that have a total spectral range of 0.350 to 2.500 µm. The spectra were taken at a height of 15 cm using an eight degree field of view. This resulted in the spectrum being an average of the material within a 2 cm diameter area. A halogen lamp was used as the light source. The lamp was allowed to warm up before the spectra were recorded to reduce the variation in the light source.

Before each end member spectrum was collected, a spectrum of a white Spectralon® plate was taken under the same conditions. The end member spectrum was then calibrated to reflectance using a ratio of the end member spectrum to the Spectralon® reference spectrum. The spectrum was then calibrated to absolute reflectance using the reflectance characteristics of the reference plate.

Manganiferous shale has a spectrum which is distinctly different from other rocks. Referring to FIG. 3, the ratio obtained by dividing the sum of the reflectance for 1.750 to 1.760 μm by the sum of the reflectance for 0.720 to 0.730 μm (manganiferous shale ratio) can be used to distinguish manganiferous shale 301 from other rock types. Referring to FIG. 4, when this ratio 304 is plotted against the weight percent of manganese oxide, it can be observed that the manganiferous shale 306 is distinct from the other rock types. Therefore, if a rock has a ratio higher than 2.4 it can be confidently classified as manganiferous shale, and a rock with a ratio lower than 2.4 is not manganiferous shale.

The samples that contain clay show significant spectral absorptions which are not present in the other samples. These absorptions can be used to distinguish the clay and shale samples from the other rock types. The ratio obtained by dividing the sum of the reflectance for 2.220 to 2.230 μm by the sum of the reflectance for 2.200 to 2.210 μm (shale ratio) is greater than 1.04 for the shales and clays due to the halloysite absorption feature around 2.2 μm. The other rock types have a ratio less than 1.03 as without the halloysite absorption the spectrum is a similar height or slightly higher at 2.200 to 2.210 μm than 2.220 to 2.230 μm. The depth of the absorption is related to the amount of halloysite in the sample, but it is also affected in the manganiferous and West Angelas shales by the change in the overall spectral shape when there is manganese present. The ratio can be used to separate shales and clays from the other rock types as a ratio higher than 1.4 indicates the presence of clay. If the manganiferous shale was separated first using the manganiferous shale ratio, the distinction between the rock types would be greater. If the clay present was not halloysite the ratio would need to be shifted slightly to match the shift of the absorption feature as it occurs at a slightly different wavelength for each type of clay. Although clay also has a distinct absorption feature around 1.4 μm, this absorption was not used as it overlaps with a water absorption feature and therefore could not be used with natural light.

Once the shale and clay samples have been identified using the shale ratio the remaining samples are easier to separate. Although silicon has no absorption features in the range used, chert and goethitic BIF can be distinguished from ochreous goethite and martite goethite by the depth of the iron absorption, the overall shape and the maximum reflectance (see the spectra 604 in FIG. 6A). When the ratio obtained by dividing the sum of the reflectance for 1.310 to 1.320 μm by the sum of the reflectance for 0.740 to 0.750 μm (chert ratio) is plotted against the weight percent of silicon dioxide as shown in FIG. 6B, these samples are divided into separate populations with the chert 602 clearly distinguishable. The martite goethite samples give a ratio below one; the chert and goethitic BIF have ratios between 1.2 and 1.6; and the ochreous goethite samples have ratios greater than 1.6. There is only a small gap between the goethitic BIF and the ochreous goethite because of the large effect even a small amount of goethite can have on the spectrum. A similar division can be observed when the maximum reflectance for the spectra is plotted against the weight percent of silicon dioxide. However, this method has an even smaller gap between the goethitic BIF (with a maximum of 0.65) and the ochreous goethite (with a minimum of 0.66). A larger sample set could be used to confirm the boundary between the goethitic BIF and ochreous goethite.

The 1.727 μm/1.016 μm ratio has been used to detect alteration in the silicification of jasperoids. When this ratio is plotted against the weight percent of silicon dioxide for the ore, BIF and chert samples it clearly distinguishes the goethitic BIF (maximum 1.62) from the ochreous goethite (minimum 1.82). The martite goethite samples give a ratio below 1.1; the chert and goethitic BIF have ratios between 1.3 and 1.7; and the ochreous goethite samples have ratios greater than 1.8.

Figure 7A:
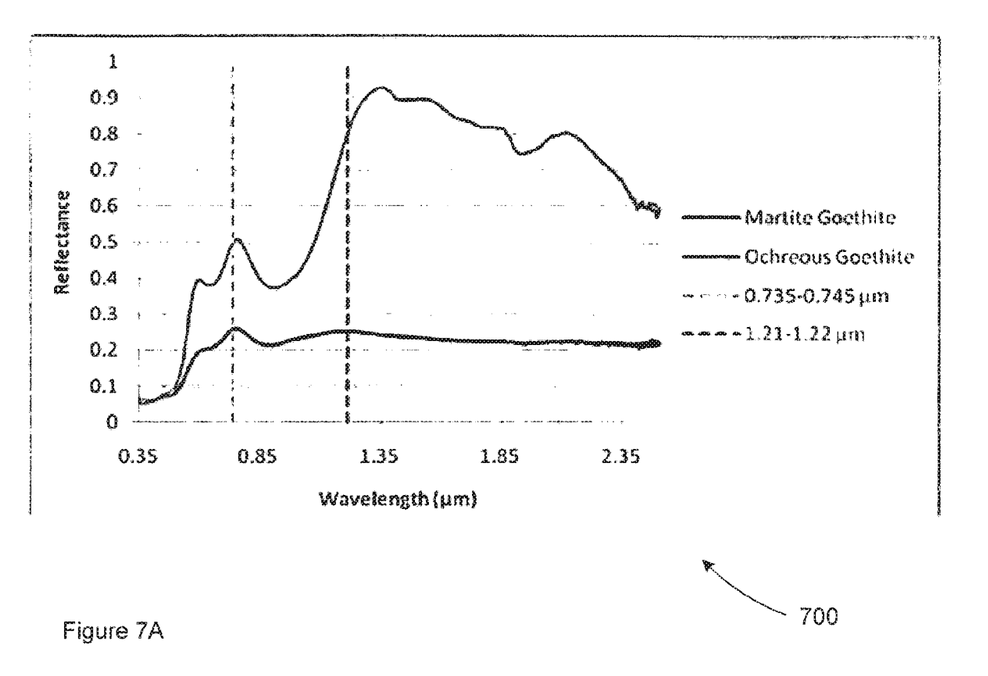
FIG. 7A shows a plot of a diagnostic spectral feature for iron.
Figure 7B:
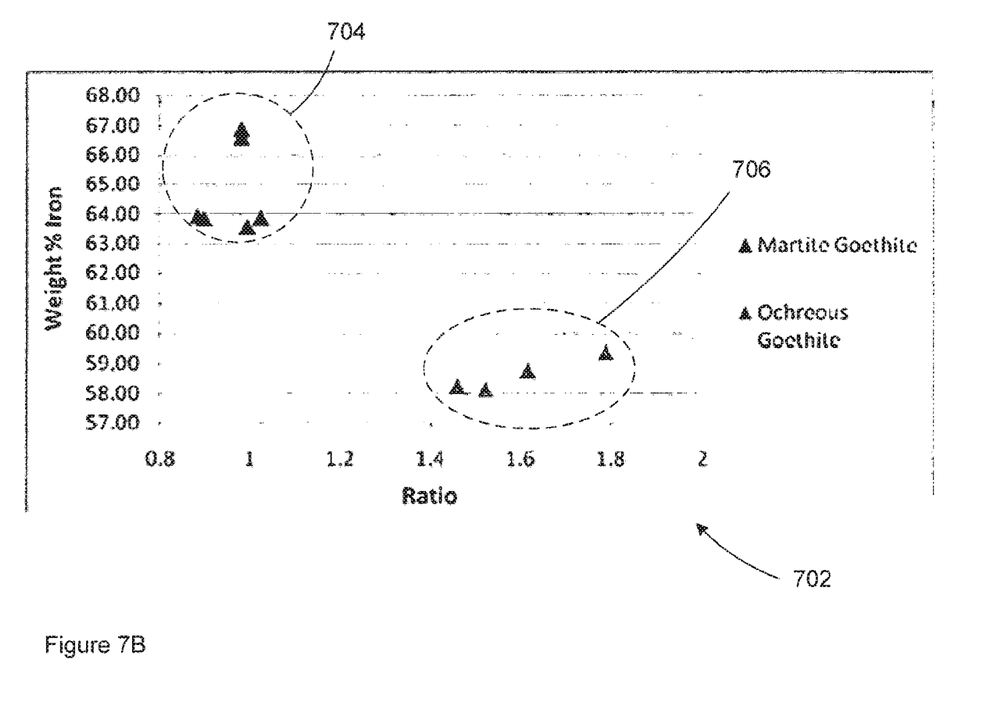
FIG. 7B shows a plot of the iron ratio against the weight percent of iron.

When the shale and chert ratios are used to remove the other sample types, the iron ores can be distinguished using the spectral differences in the iron features as shown in the spectra 700 plotted in FIG. 7A. When the ratios 702 obtained by dividing the sum of the reflectance for 1.210 to 1.220 μm by the sum of the reflectance for 0.735 to 0.745 μm (iron ratio) is plotted against the weight percent of iron, the iron ores are clearly divided into two groups. Samples with a ratio below 1.1 are martite goethitic 704 and contain above 63 weight percent iron. Samples with a ratio above 1.4 are ochreous goethite 706 and contain less than 60 weight percent iron. This ratio can therefore be used to separate the iron ores and distinguish their grade. When the iron ratio is plotted against the weight percent of silicon dioxide similar groups can be observed due to the silicon content having an inverse correlation to the iron content. Samples with a ratio below 1.1 contain less than 1.5 weight percent silicon dioxide. Samples with a ratio above 1.4 contain between 2.5 and 3.0 weight percent silicon dioxide.

When an absorption feature is particularly well defined, such as the halloysite features, they can be used to predict the concentration or weight percent of a compound in the rock. For the West Angelas rocks, the only mineral with a spectral ratio sufficiently unaffected by the other minerals present is halloysite. The ratio obtained by dividing the sum of the reflectance for 2.175 to 2.180 μm by the sum of the reflectance for 2.205 to 2.210 μm ($Al_2O_3$ ratio) can be used to predict the weight percent of $Al_2O_3$ in the sample. When a regression analysis is performed using the weight percent $Al_2O_3$ as the independent variable x and the $Al_2O_3$ ratio as the dependent variable y it gives the formula:

$$y=(0.0059\pm0.0005)x+(1.014\pm0.007)$$

This has an adjusted R squared value of 0.855 and a standard error of 0.028. The above equation can then be used to estimate the weight percent $Al_2O_3$ from a spectrum for which there is no information about the rock composition.

Spectral ratios can therefore be used to distinguish different rock types from the West Angelas mine. The manganiferous shale and shale ratios can be used to separate the different shales and clays from the other rock types. The chert ratio and the maximum reflectance can then be used to separate the goethitic BIF and chert from the iron ores. However, the spectral difference between the rock types is smaller here due to the strong influence of iron in the spectra and the lack of distinguishing features for silica.

Spectral ratios use the comparative depth of absorption features and changes in the overall shape of the spectrum to identify rocks using only a small portion of the hyperspectral range. The West Angelas mine rock types have been distinguished using four ratios: the manganiferous shale ratio (1.750 to 1.760 μm/0.720 to 0.730 μm); shale ratio (2.220 to 2.230 μm/2.200 to 2.210 μm); 1.727 μm/1.016 μm ratio (1.720 to 1.730 μm/1.010 to 1.020 μm); and martite goethite ratio (0.920 to 0.930 μm/0.850 to 0.860 μm).

The four ratios and their corresponding classification thresholds may be used in method 200 to determine rock types based on spectra measured at the West Angelas mine. This may provide real-time automated geological assessment that may be used in removing material from a mine bench face and in transporting removed material for processing in accordance with the rock-type determination.

7.2 Discussion of Example Results

Spectral data can be used to identify the main minerals present, and therefore objectively classify a mine rock sample.

The rock types of the West Angelas mine could be classified using five ratios, one ratio to identify high angle spectra and four ratios to determine rock type. The data could be acquired using a ten-band multispectral system, thereby eliminating the need for a full hyperspectral system.

Four spectral ratios can be used to quickly and objectively classify the West Angelas mine rock types. The manganiferous shale ratio (1.750 to 1.760 μm/0.720 to 0.730 μm), shale ratio (2.220 to 2.230 μm/2.200 to 2.210 μm), 1.727 μm/1.016 μm ratio (1.720 to 1.730 μm/1.010 to 1.020 μm) and martite goethite ratio (0.920 to 0.930 μm/0.850 to 0.860 μm). These spectral ratios were chosen so that they are not affected by the atmospheric absorptions that occur when natural light is used.

Non-linear mixing effects were observed in the spectra due to the small grain size in the samples. This results in even a small amount of goethite in a chert or BIF sample having a large effect on the spectrum observed. Therefore the most difficult rock types to distinguish are the ochreous goethite, goethitic BIF and chert.

Spectral ratios provide a fast and objective method of classifying the shales, martite/goethite ore zones and BIF present at the West Angelas iron mine. The ratios may be used to provide real-time automated geological assessment. Currently a subjective visual classification is used that can lead to incorrect classification and which cannot be automated. Therefore, an objective classification such as the spectral ratio techniques described herein may be fundamental to the development of future automated mining techniques.

It will be understood that the invention disclosed and defined in this specification extends to all alternative combinations of two or more of the individual features mentioned or evident from the text or drawings. All of these different combinations constitute various alternative aspects of the invention.

The present application claims priority from Australian provisional application AU2010900467, "Determination of rock types by spectral scanning" filed 5 Feb. 2010, the entire contents of which are incorporated herein by reference.

Appendix 1 Matlab script for distinguishing West Angelas mine rock types

```
%clear former values
clear
%load spectrum (without headings)
load spectra.txt
%create strings for the wavelength and reflectance data
wavelength=spectra(:,1);
reflectance=spectra(:,2);
%manganiferous shale ratio
%get the reflectance values for 1750-1760 nm
for i=1:length(wavelength)
```

Appendix 1 Matlab script for distinguishing West Angelas mine rock types

```
    if wavelength(i,1)>=1750;
        mshale1(i,1)=reflectance(i,1);
    else mshale1(i,1)=NaN;
    end
end
for i=1:length(wavelength)
    if wavelength(i,1)>1760;
        mshale1(i,1)=NaN;
    end
end
mshale1_filt=mshale1(~isnan(mshale1));
mshale1_total=sum(mshale_filt);
%get the reflectance values for 720-730 nm
for i=1:length(wavelength)
    if wavelength(i,1)>=720;
        mshale2(i,1)=reflectance(i,1);
    else mshale2 (i,1)=NaN;
    end
end
for i=1:length(wavelength)
    if wavelength(i,1)>730;
        mshale2(i,1)=NaN;
    end
end
mshale2_filt=mshale2(~isnan(mshale2));
mshale2_total=sum(mshale2_filt);
%calculate the ratio 1750-1760nm / 720-730 nm
Mshale = mshale1_total/mshale2_total;
%shale ratio
%get the reflectance values for 2220-2230 nm
for i=1:length(wavelength)
    if wavelength(i,1)>=2220;
        shale1(i,1)=reflectance(i,1);
    else shale1 (i,1)=NaN;
    end
end
for i=1:length(wavelength)
    if wavelength(i,1)>2230;
        shale1(i,1)=NaN;
    end
end
shale1_filt=shale1(~isnan(shale1));
shale1_total=sum(shale1_filt);
%get the reflectance values for 2200-2210 nm
for i=1:length(wavelength)
    if wavelength(i,1)>=2200;
        shale2(i,1)=reflectance(i,1);
    else shale 2 (i,1)=NaN;
    end
end
for i=1:length(wavelength)
    if wavelength(i,1)>2210;
        shale2(i,1)=NaN;
    end
end
shale2_filt=shale2(~isnan(shale2));
shale2_total=sum(shale2_filt);
%calculate the ratio 2220-2230 nm / 2200-2210 nm
Shale = shale1_total/shale2_total;
%chert ratio
%get the reflectance values for 1720-1730 nm
for i=1:length(wavelength)
    if wavelength(i,1)>=1720;
        chert1(i,1)=reflectance(i,1);
    else chert1 (i,1)=NaN;
    end
end
for i=1:length(wavelength)
    if wavelength(i,1)>1730;
        chert1(i,1)=NaN;
    end
end
chert1_filt=chert1(~isnan(chert1));
chert1_total=sum(chert1_filt);
%get the reflectance values for 1010-1020 nm
for i=1:length(wavelength)
    if wavelength(i,1)>=1010;
```

Appendix 1 Matlab script for distinguishing West Angelas mine rock types

```
        chert2(i,1)=reflectance(i,1);
      else chert2 (i,1)= NaN;
      end
    end
    for i=1:length(wavelength)
      if wavelength(i,1)>1020;
        chert2(i,1)=NaN;
      end
    end
    chert2_filt=chert2(~isnan(chert2));
    chert2_total=sum(chert2_filt);
    %calculate the ratio 1720-1730 nm / 1010-1020 nm
    Chert = chert1_total/chert2 _total;
    %martite goethite ratio
    %get the reflectance values for 920-930 nm
    for i=1:length(wavelength)
      if wavelength(i,1)>=920;
        martite1(i,1)=reflectance(i,1);
      else martite1 (i,1)=NaN;
      end
    end
    for i=1;length(wavelength)
      if wavelength(i,1)>930;
        martite1(i,1)=NaN;
      end
    end
    martite1_filt=martite1(~isnan(martite1));
    martite1_total=sum(martite1_filt);
    %get the reflectance values for 850-860 nm
    for i=length(wavelength)
      if wavelength(i,1)>=850;
        martite2(i,1)=reflectance(i,1);
      else martite2 (i,1)=NaN;
      end
    end
    for i=1:length(wavelength)
      if wavelength(i,1)>860;
        martite2(i,1)=NaN;
      end
    end
    martite2_filt=martite2(~isnan(martite2));
    martite2_total=sum(martite2_filt);
    %calculate the martite goethite ratio 920-930 nm / 850=860 nm
    Martite = martite1_total/martite2_total;
    %compare the spectral ratios to the ranges to determine the rock type
    if Mshale>2.4
      Rock = 'Manganiferous shale';
    else
      if Shale>1.03
        Rock = 'Shale or Water Reactive Clay';
      else
        if Chert<1.1
          if Martite<0.96
            Rock = 'Chert';
          else Rock = 'Martite goethite';
          end
        else
          if Chert<1.75
            Rock = 'Chert rich';
          else Rock = 'Ochreous goethite';
          end
        end
      end
    end
```

What is claimed is:

1. A method of controlling mining equipment removal of material from a rock body, comprising:
producing, by a processing system, rock type classifying data for the rock body by:
scanning a surface of a rock body with a spectral sensor to obtain spectral data from the rock body surface, said data comprising multiple spectra obtained from scanned regions of the rock body surface,
determining, by the processing system, for differing spectra within the multiple spectra a plurality of spectral ratios as indicators of differing rock types, the spectral ratios being derived from a comparison of the spectral data at different specific wavelength bands associated with diagnostic absorption features of the differing rock types, said comparison comprising dividing a sum of reflectance in a first wavelength band by a sum of reflectance in a second wavelength band,
comparing, by the processing system, the spectral ratios to a threshold ratio, the spectral ratios used for the comparing are based on the dividing of the sum of reflectance in the first wavelength band by the sum of reflectance in the second wavelength band, the threshold ratio predetermined to define spectral ratios indicative of an absorption feature associated with edge anomalies of at least one edge of a portion of the rock body, and
in response to a determination, based on the comparing, that the spectral ratios do not indicate an absorption feature associated with edge anomalies, classifying, by the processing system, one or more rock types present at the rock body surface based on the spectral ratios and generating rock type classifying data for the rock body based on the classifying.

2. The method of claim 1, wherein the spectral ratios are determined from spectral data at wavelength bands which are not affected by atmospheric absorption under natural light illumination.

3. The method of claim 1, wherein the rock body is a mineable rock body in a mine and the method is used to make ore grade assessments of the rock body for mining.

4. A method of mining comprising:
producing rock type classifying data for a rock body by:
scanning a mine bench face with a spectral sensor to obtain spectral data from the rock body at the bench face, said data comprising multiple spectra obtained from scanned regions of the rock body surface,
determining, by a processing system, for differing spectra within the multiple spectra a plurality of spectral ratios as indicators of differing rock types, the spectral ratios being derived from a comparison of the spectral data at different specific wavelength bands associated with diagnostic absorption features of the differing rock types, said comparison comprising dividing a sum of reflectance in a first wavelength band by a sum of reflectance in a second wavelength band,
comparing, by the processing system, the spectral ratios to a threshold ratio, the spectral ratios used for the comparing are based on the dividing of the sum of reflectance in the first wavelength band by the sum of reflectance in the second wavelength band, the threshold ratio predetermined to define spectral ratios indicative of an absorption feature associated with edge anomalies of at least one edge of a portion of the rock body, and
in response to a determination, based on the comparing, that the spectral ratios do not indicate an absorption feature associated with edge anomalies, classifying, by the processing system, one or more rock types present at the rock body surface based on the spectral ratios and generating rock type classifying data for the rock body based on the identifying.

5. The method of claim 4, wherein the spectral ratios are determined from spectral data at wavelength bands which are not affected by atmospheric absorption under natural light illumination.

6. A method for removing material from a rock body comprising:
   producing rock type classifying data for the rock body by:
   obtaining, at a processor for processing images, spectral data from a spectral measurement of a surface region of the rock body,
   determining, by the processor, a first spectral ratio between two wavelength bands of the spectral data,
   comparing, by the processor, the first spectral ratio to a threshold ratio, the threshold ratio predetermined to define spectral ratios that indicate an absorption feature associated with edge anomalies of at least one edge of a portion of the rock body,
   in response to a determination, based on the comparing, that the first spectral ratio does not indicate an absorption feature associated with edge anomalies, determining, by the processor, a further spectral ratio between two further wavelength bands of the spectral data,
   comparing, by the processor, the further spectral ratio with a corresponding diagnostic criterion to assess whether the surface region comprises a first rock type associated with the further spectral ratio and diagnostic criterion, and
   classifying, by the processor, the first rock type present at the rock body surface based on the assessment of the further spectral ratio and diagnostic criterion and generating rock type classifying data for the rock body based on the classifying;
   and
   wherein the spectral measurement comprises images at discrete and narrow bands, including the wavelength bands for the first spectral ratio and the further spectral ratio.

7. The method of claim 6 comprising:
   determining a plurality of further spectral ratios between respective wavelength bands of the spectral data; and
   sequentially comparing the plurality of further spectral ratios with corresponding diagnostic criteria to classify a rock type of the surface region.

8. The method of claim 6 wherein the measurement is assessed to be associated with edge anomalies if the first spectral ratio exceeds an edge anomaly threshold.

* * * * *